F. W. BURPEE.
CAN SEAMING MACHINE.
APPLICATION FILED JUNE 17, 1916.
1,230,273.
Patented June 19, 1917.
2 SHEETS—SHEET 2.
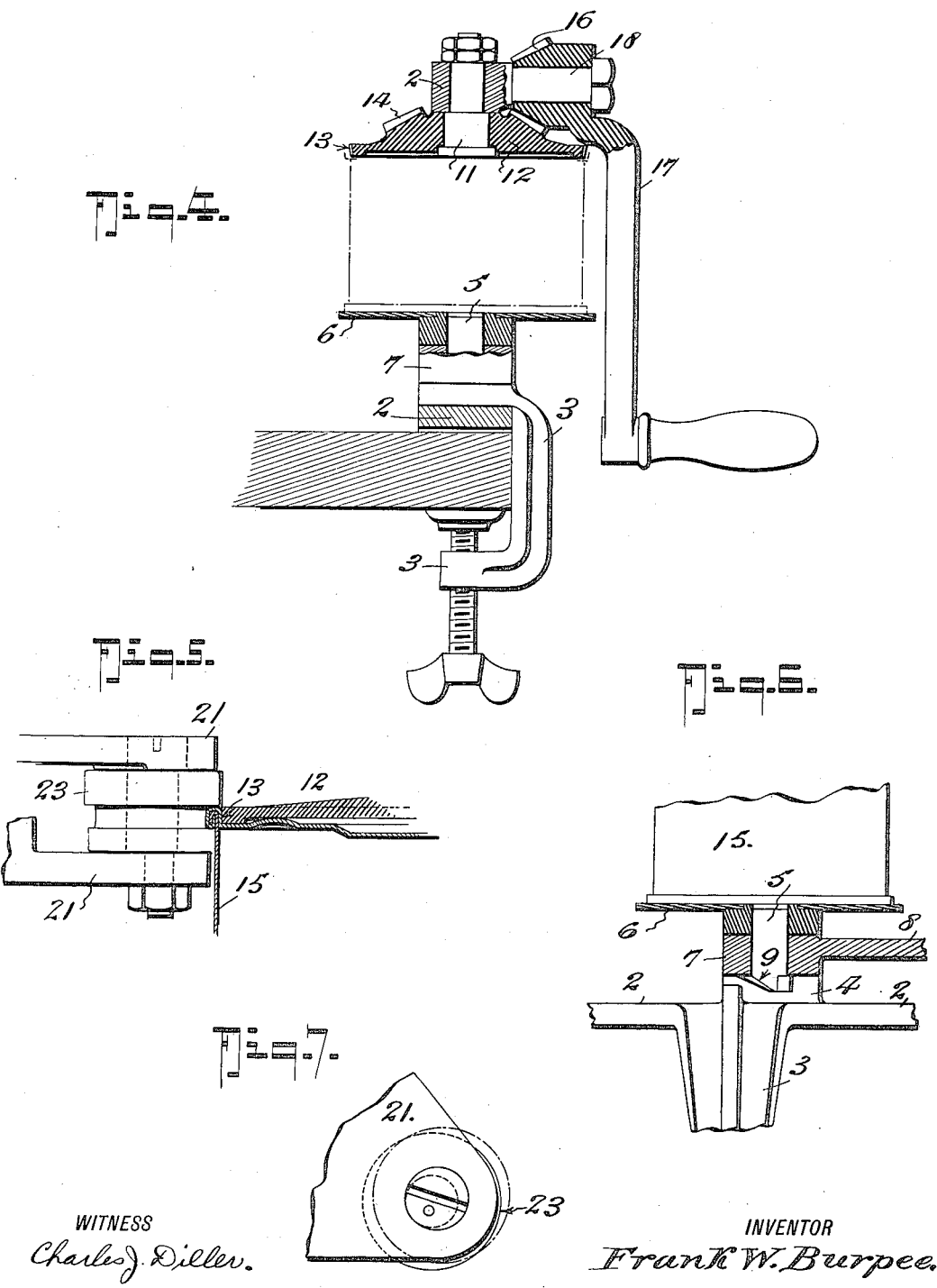
WITNESS
Charles J. Diller.
INVENTOR
Frank W. Burpee.
BY
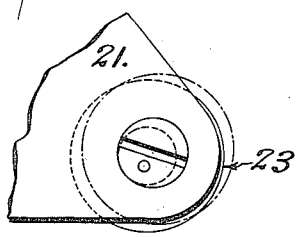
ATTORNEYS

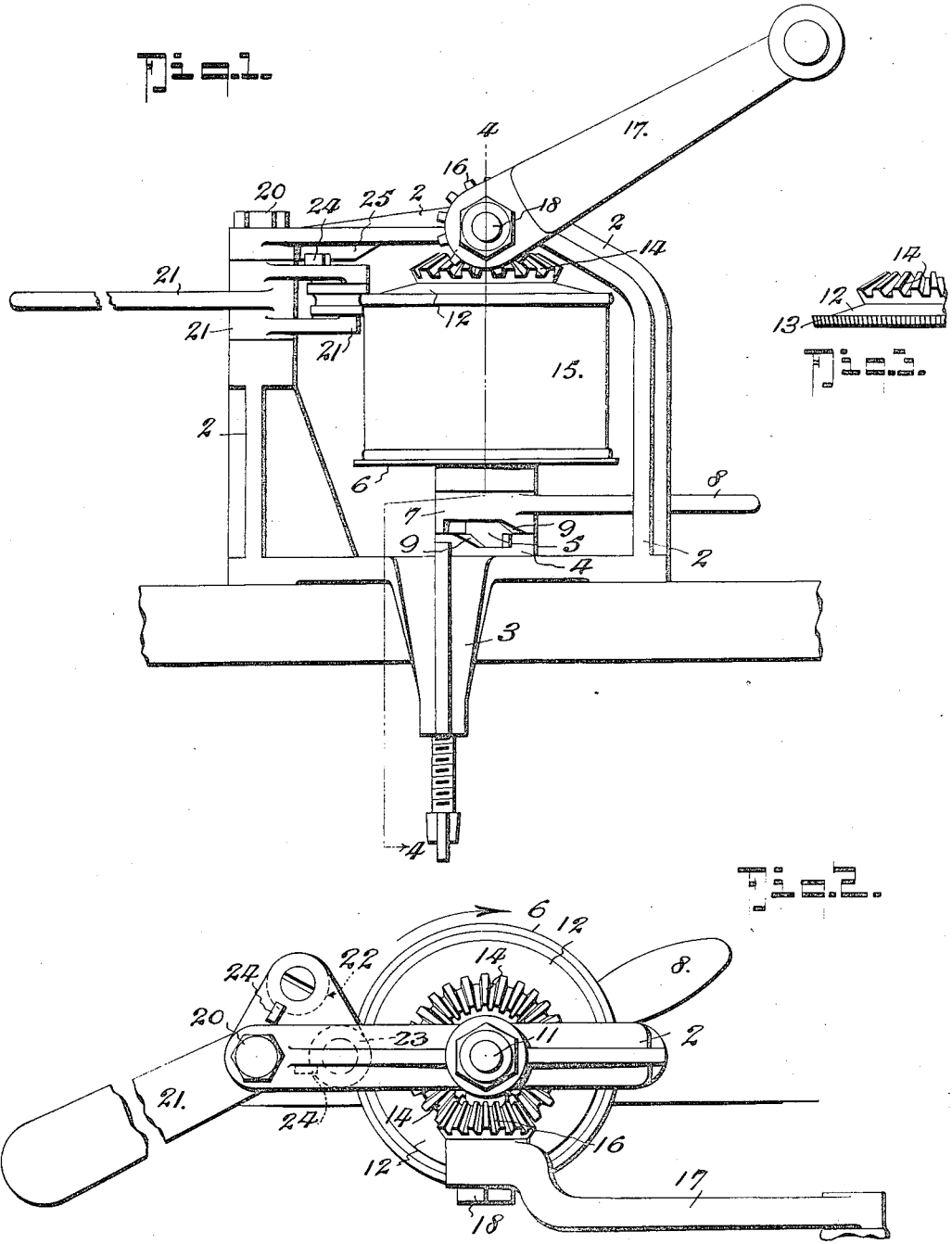

UNITED STATES PATENT OFFICE.

FRANK W. BURPEE, OF SOUTH BELLINGHAM, WASHINGTON.

CAN-SEAMING MACHINE.

1,230,273.  Specification of Letters Patent.  Patented June 19, 1917.

Application filed June 17, 1916. Serial No. 104,272.

*To all whom it may concern:*

Be it known that I, FRANK W. BURPEE, a citizen of the Dominion of Canada, residing at South Bellingham, in the county of Whatcom and State of Washington, have invented certain new and useful Improvements in Can-Seaming Machines, of which the following is a specification.

This invention relates to a hand-operated double seamer for seaming a cover on a can in a manner that the edge of the can body and the edge of its cover are double-folded together and tightly closed on one another and on the can body to make a hermetically sealed joint without the use of solder.

The object of the invention is to provide a simple, cheap and effective hand-operated machine suitable for use in small factories, or where hand labor is relatively cheap.

The device is of small size and is adapted to be removably attached to a bench or the like, and the can with its cover applied is endwise clamped with a resilient endwise pressure in a rotatable chuck which is driven by hand, and while the can is being rotated, the seaming rollers are manually applied with a strong pressure to form and close the seam of the cover on the can body.

The invention is particularly described in the following specification, reference being made to the drawings by which it is accompanied, in which:

Figure 1 is a front elevation of the machine with a can in position as for seaming.

Fig. 2, a plan of the same.

Fig. 3, an enlarged detail showing the knurled edge of the driving chuck plate.

Fig. 4, a vertical section on the line 4—4 in Fig. 1.

Fig. 5, an enlarged detail in section showing the application of the edge of the driving head and one of the seaming rollers to the can bead.

Fig. 6 is a detail elevation and part section showing the can chuck hereinafter referred to. Fig. 7 is a detail plan view showing the adjustment of the seaming roller pin in its radial distance from the pivot of the lever.

In these drawings 2 represents an open frame in which the several mechanisms of the seamer are supported and having provision at 3, forwardly and downwardly projecting from the base of the frame for clamping it to a bench. Secured in and upwardly projecting from a boss 4 on the base portion of the frame 2 is a stud 5 on which is rotatably mounted the hub of a flexible resilient lower chuck plate 6. Interposed on the stud 5 between the hub of the chuck plate and the boss 4 of the frame is a handle lever 8, the under surface of the hub of which has inclined faces 9 to engage corresponding inclined faces on the upper surface of the boss 4. Partial rotation of the lever 8 will thus lift or lower the chuck plate 7.

Rotatably mounted on a pin 11 secured in and downwardly projecting from the upper part of the frame 2 in axial alinement with the upwardly projecting stud 5 on which the lower chuck plate rotates, is the upper chuck plate 12, the lower edge 13 of which is formed to engage the inner side of the recess of the can cover adjacent the beading edge. As shown in Fig. 3, the edge 13 is knurled to effect a driving hold of the can cover when the latter is pressed upward into engagement with it.

The upper side of the driving head 12 is formed with bevel teeth as at 14, in which teeth mesh those of a pinion 16 formed on the hub of a crank handle 17 which is rotatably mounted on a stud 18 integral with and projecting from the frame 2.

With this provision, if a can body 15 with its cover applied is placed on the lower chuck plate 6 and the handle 8 is partially rotated, the can will be lifted by the action of the inclines 9 to press the edge of its can cover recess tightly upon the engaging edge 13 of the driving head 12, and that pressure will be a yielding one owing to the resilience of the lower plate 6. The can so clamped between the lower plate 6 and the upper plate 12 of the chuck will be secured to rotate with the upper chuck plate or driving head by means of the crank handle 17.

Pivotally mounted on a pin 20 in one side of the frame 2 is a hand lever 21, the inwardly projecting end of which is jawed to receive a series of seaming rollers 22, 23 mounted on pins to rotate freely in the plane of the seam of the can cover with the upper edge of its body. These rollers 22, 23 are circumferentially grooved to successively form the seam by doubling and folding inward together the edges of the cover and the can body, as shown in Fig. 5, the roller 22 performing the first part of the operation, and 23 the final closing of the fold against the body of the can, during which operations the seam is strongly held up to the pressure of the seaming rollers by the fit of the upper chuck plate within the cover at 13.

The upper side of the end of the lever 21 in which the seaming rollers are mounted has stop projections 24 which are designed to engage the opposite sides of a medial web 25 downwardly projecting from the underside of the upper part of the frame 2, and check movement of the lever beyond what is necessary to bring either roller to the limit of its full compression on the seam of a can mounted in the chuck, that is, when the axis of the pin 20 on which the seaming roller is mounted is in the line between the axis of the chuck and the center of the pin 20 on which the lever 21 is mounted.

Attention may here be drawn to the fact that the pressure with which each roller is applied to the seam is not that alone due to the leverage of the handle 21 but to the converging arcs of the can circumference and that in which the axes of the seaming rollers move, with a roller mounted on its pin; so that with a relatively short leverage from the fulcrum pin 20 to the hand application, a considerable pressure is applied to compress the can cover seam, which pressure becomes more intense as the final stage of compression is reached, that is, when the axis of the seaming roller is stopped at the line referred to joining the center of the can chuck and the pivot center of the lever.

It will also be noted that the strong resilient end pressure imposed in clamping the can in the chuck tends to force the initially outward flanged upper edge of the can into the curl of the seam's fold. The resilience of the endwise clamping pressure follows the slight shortening of the cans caused by this infolding without sensibly reducing the clamping pressure.

The provision of a stop, definitely locating each seaming roller at the limit of its maximum movement toward the can, is an important feature in the design of the machine for, to attain a satisfactory seam, it is desirable that the rolling of it be continued for several revolutions after the maximum limit of the roller onto it has been attained, and unless a stop is provided it is difficult to maintain the seaming roller in the position of its maximum effort.

With rotation of the can in the direction indicated by the arrow in Fig. 2, the roller 22, by which the primary operation of seaming is performed, is moved against the can against its direction of rotation, and this roller is selected for this position as the primary seaming operation requires less pressure to effect it than for the final closing. The secondary seaming roller 23 being on the opposite side of the stop 25, moves into action in the same direction as the rotation of the can so that the rotation of the can assists the manual effort of pressing the roller against the seam.

To provide a means for independent adjustment of the seaming rollers 22 and 23 in their distance from the axis of rotation of the can chuck, that portion of each pin on which its roller runs, see Figs. 5 and 7, is eccentric with the portion of it that fits in the jaw of the lever 21, and the head of the pin is notched for application of a screw-driver, and the other end is threaded to receive a nut so that the pin may be partially rotated in its bearing in the lever to adjust the roller and thereafter the pin may be secured by the nut in that position of adjustment.

An exceedingly simple, inexpensive and efficient double-seaming machine is thus provided, which, being manually operated, is adapted to the requirements of packers putting up only small quantities of goods, and in its low cost and its freedom from the inconvenience of soldering particularly fitted for domestic use in preserving fruit, vegetables and the like.

Having now particularly described my invention, I hereby declare that what I claim as new and desire to be protected in by Letters Patent, is:

1. A hand-operated double-seaming machine for cans which comprises the combination with a suitable frame having provision for removably securing it to a bench or the like, of a flexible resilient chuck plate, means for rotatably mounting said chuck plate by a rigid support at its center so that it does not yield at the central point but is adapted to be bowed down beyond the point where it is supported, said mounting means being located on the lower part of the frame and susceptible of endwise movement on its axis of rotation, a driving chuck plate rotatably mounted in the upper part of the frame in axial alinement with the lower chuck plate, said driving chuck plate having a depending annular portion adapted to engage the cover of a can sustained on the lower plate and rotate the can, means for endwise moving the lower chuck plate to press the cover of a can on it into driving contact with the driving chuck plate, means for manually rotating the driving chuck plate, a seaming roller, and means for manually pressing said seaming roller on the combined edges of the cover and can.

2. A hand-operated double-seaming machine for cans, said machine comprising the combination with a suitable frame having provision for securing it to a support, of a flexible resilient chuck plate rotatably mounted at its center on the lower part of the frame and susceptible of endwise movement on its axis of rotation, a driving chuck plate rotatably mounted in the upper part of the frame in axial alinement with the lower chuck plate, said driving chuck plate adapted to engage the cover of the can on the lower plate and rotate the can, means for endwise moving the lower chuck plate to press the cover of a can on it into driving contact with the driving chuck plate, a lever pivotally mounted on the frame to move in a plane approximate that of the can cover seam, the inner end of said lever having seam forming rollers rotatably mounted in it at approximately equal radial distances from the fulcrum of the lever, and stops limiting the movement of the axis of each seaming roller adjacent to a line joining the fulcrum of the lever and the axis of rotation of the can holding chuck, said rollers lying one on each side of the center line between the fulcrum of the seaming roller lever and the axis of rotation of the can, and means for independently varying the distance of the axis of each seaming roller from the fulcrum of the lever.

3. A hand-operated double-seaming machine for cans which comprises the combination with a suitable frame having provision for removably securing it to a bench or the like, a flexible resilient chuck plate, means on the lower part of the frame and susceptible of endwise movement for rotatably mounting said lower chuck plate by a support rigidly securing the plate at its central point, said plate being adapted to be bowed down beyond the place where it is supported, a driving chuck plate rotatably mounted in the upper part of the frame in axial alinement with the lower chuck plate, such driving chuck plate being adapted to engage the cover of a can sustained on the lower plate and rotate the can, means also mounted on said frame for rotating said driving chuck plate, means for endwise moving the lower chuck plate to press the cover of a can on it into driving contact with the driving chuck plate, a lever pivotally mounted on the frame, a pair of seaming rollers carried by said lever and adapted to alternately be pressed on the combined edges of the cover and can substantially as shown and described.

4. A hand operated double-seaming machine for cans which comprises the combination with a suitable frame having provision for securing it to a support, of a can chuck plate rotatably mounted on the lower part of the frame and susceptible of endwise movement on its axis of rotation, a driving chuck plate rotatably mounted in the upper part of the frame in axial alinement with the lower chuck plate, said driving chuck plate being adapted to engage the cover of a can on the lower plate and rotate the can, means for endwise moving the lower chuck plate to press the cover of a can on it into driving engagement with the driving chuck plate, a lever pivotally mounted on the frame to move in a plane approximate that of the can cover seam, the inner end of said lever having seam forming rollers rotatably mounted in it at approximately equal radial distances from the fulcrum of the lever, said rollers being located one on each side of the center line between the fulcrum of the seaming roller lever and the axis of rotation of the can, and stops limiting movement of the axis of each seaming roller adjacent to said line.

In testimony whereof I affix my signature.

FRANK W. BURPEE.